United States Patent
Saito

Patent Number: 5,774,134
Date of Patent: Jun. 30, 1998

[54] GRAPHIC DISPLAY DEVICE HAVING FUNCTION OF DISPLAYING TRANSFER AREA

[75] Inventor: Hideki Saito, Kawasaki, Japan

[73] Assignee: Fujitsu Limited, Kawasaki, Japan

[21] Appl. No.: 874,579

[22] Filed: Jun. 13, 1997

Related U.S. Application Data

[63] Continuation of Ser. No. 314,691, Sep. 29, 1994, abandoned, which is a continuation-in-part of Ser. No. 288,723, Aug. 15, 1994, abandoned.

[51] Int. Cl.[6] .............................. G09G 5/36; G06F 13/00
[52] U.S. Cl. ......................... 345/509; 345/203; 345/435; 345/507; 345/511
[58] Field of Search .................................... 345/435, 441, 345/113, 521, 526, 507, 509, 515, 191, 511, 203

[56] References Cited

U.S. PATENT DOCUMENTS

| | | | |
|---|---|---|---|
| 5,053,761 | 10/1991 | Webster, III | 345/123 |
| 5,117,286 | 5/1992 | Jeong | 348/17 |
| 5,335,322 | 8/1994 | Mattison | 345/185 |
| 5,361,387 | 11/1994 | Millar et al. | 345/201 |
| 5,363,500 | 11/1994 | Takeda | 345/201 |
| 5,381,347 | 1/1995 | Gery | 345/502 |
| 5,389,947 | 2/1995 | Wood et al. | 345/153 |
| 5,428,724 | 6/1995 | Silverbrook | 395/135 |
| 5,444,839 | 8/1995 | Silverbrook et al. | 395/141 |
| 5,457,482 | 10/1995 | Rhoden et al. | 345/508 |
| 5,457,776 | 10/1995 | Wong et al. | 345/202 |

*Primary Examiner*—Matthew M. Kim
*Assistant Examiner*—U. Chauhan
*Attorney, Agent, or Firm*—Staas & Halsey

[57] ABSTRACT

A graphic display device for displaying image data provided from a memory includes a transfer memory unit for storing the image data transferred from the memory, a display memory unit for storing the image data transferred from the transfer memory unit, and a display unit for displaying the image data supplied from an image source, the image source being the display memory unit in a first operation mode of the graphic display device. The graphic display device further includes a switching unit for selecting the image source from the display memory unit or the transfer memory unit, so that the display unit can display the image data stored in the transfer memory unit in a second operation mode of the graphic display device.

6 Claims, 11 Drawing Sheets

5,774,134

GRAPHIC DISPLAY DEVICE HAVING FUNCTION OF DISPLAYING TRANSFER AREA

This a continuation of Ser. No. 08/314,691, filed on Sep. 29, 1994, now abandoned, which was a continuation-in-part of Ser. No. 08/288,723, filed on Aug. 15, 1994, now abandoned.

BACKGROUND OF THE INVENTION

The present invention generally relates to graphic display devices, and more particularly relates to a graphic display device which has two frame memories as a transfer area and a display area, and which can display both areas.

In recent years, there has been an increasing demand for higher capabilities of displaying 3D images and windows in graphic display systems. In such systems, various types of images are first stored in a 2D frame memory, and, then, are displayed on a display screen. In order to have a smooth change on the display screen from one frame to another, a typical 2D frame memory system has a transfer area and a display area separately. Image data created by an image drawing part is first transferred to the transfer area, and, upon the completion of the transfer, the image data is transferred from the transfer area to the display area by a high speed transfer method such as the BIT-BLT (Bit Block Transfer) method. Then, the image data stored in the display area is displayed.

The BIT-BLT method transfers image data of only a rectangular area whose size and destination coordinates are given by a control LSI circuit. If such a high speed image transfer method is not employed or there is no intermediate frame memory as a transfer area, memory access on the display area by a CPU (Central Processing Unit) upon a user's demand for a window operation can create competing demands for access to the memory between the CPU and the image drawing part.

If an access demand by the CPU is given priority, there can be a significant reduction in an image transfer speed from the image drawing part to the display area, and, also, an image displayed on the CRT can show visible flickers. If the access demand by the CPU is let wait, this creates a cause for frustration on the user's side. Those problems can be dissipated by employing a transfer area serving as an intermediate frame memory and BIT-BLT transfer between the transfer area and the display area, since an access demand created by a user can wait for high speed BIT-BLT transfer.

In such a system as described above, there are a plenty of image data transfers within the system. Thus, when testing the system, it is required to check if image transfers are functioning without any errors.

FIG. 1 shows a block diagram of the prior art. A 3D image data is stored in a 3D frame memory 51 in a 3D form by using the z buffer method and the like. In displaying a 3D image, a 3D image data stored in the 3D frame memory 51 is transferred to a 2D frame memory unit 52 after transforming the 3D image data into a 2D image data. Here, the 2D frame memory unit 52 is comprised of a 2D frame memory 53 and a display unit 54.

An image data in the 3D frame memory 51 is first transferred to a transfer area 55 of the 2D frame memory 53 pixel by pixel so that a transferred image is formed pixel after pixel in the transfer area 55. When the data of the entire image is stored in the transfer area 55, a high speed transfer method like the BIT-BLT method which transfers image data block by block transfers the image data from the transfer area 55 to a display area 56 of the 2D frame memory 53.

The image data stored in the display area 56 is read out by the display unit 54, and, then, is provided for a CRT 57 after the transformation of the image data from a digital form to an analog signal. The CRT 57 displays the image by using the analog signal provided by the display unit 54.

FIG. 2 shows a block diagram of the display unit 54. The display unit 54 comprises a control plane RAM 58, an overlay plane RAM 59, a display control unit 60, and a D/A convertor 61.

The display control unit 60 receives two image data from the display area 56 and the overlay plane RAM (Random Access Memory) 59, and provides an output image, which is controlled pixel by pixel by the control data stored in the control plane RAM 58 in an image form of the same dimension as the image data. The control data in the control plane RAM 58 is provided externally, and, also, the image data stored in the overlay plane RAM 59 is provided externally to be used for overlaying the image data stored in the display area 56.

The image data generated by the display control unit 60 is provided for the D/A converter 61, which converts the image data into an analog signal. The CRT 57 receives the analog signal, which is in a form that can be used for displaying the image.

FIG. 3 is an illustrative drawing showing how each element of the system works to form a resulting image displayed on the CRT 57. In FIG. 3, each rectangle showing an frame is an image stored in a image frame memory such as 3D frame memory 51, the transfer area 55, and so on, except for one rectangle shown at the bottom which illustrates the resulting image displayed on the CRT 57.

A 3D picture created and stored in the 3D frame memory is transformed into a 2D image, which is sent to the transfer area of the 2D frame memory. After the completion of the transfer, the 3D picture in a 2D form is transferred from the transfer area to the display area by the BIT-BLT method, where the coordinates of the transferred image in the display area are different from that in the transfer area. The display area also stores a picture previously transferred from the transfer area, so that this image is overlaid with the 3D picture in a 2D form.

Then, the image stored in the display area and an image stored in the overlay plane are combined together. In so doing, control data stored in the control plane is used for selecting each pixel to be displayed on the CRT from either one of the two images. The control data in the control plane indicates that a rectangular area in the top right should be a corresponding part of the overlay plane. In this case, this corresponding part of the overlay plane is a menu, which might be used as a menu for a window system. Also, the control data indicates that remaining part of the resulting image should be from the display area.

As shown at the bottom of FIG. 3, the resulting image is comprised of the menu, the 3D picture in a 2D form, and the picture existing from a previous frame.

FIGS. 4A to 4D show the structure of the image data treated by the display control unit 60.

The image data used in the display control unit 60 is comprised of R, G, B, and control planes 72, 73, 74, and 75, and each plane is structured in a 2D array of 2k pixels by 2k pixels, each of which pixels is 8 bits. The R plane 72 represents pixel by pixel the luminance of the red light component by 8 bit data, the G plane 73 is for the green light component, and the B plane 74 for the blue light component.

As shown in FIGS. 4C and 4D, the control plane 75 has 8 bits, and the first and second bits are used as LUT (Look Up Table) switching bits, the third bit as a color-index/full-color switching bit, the fourth bit as a overlay-plane/display-area switching bit, and the fifth through eighth bits as the work area, which is not used at present.

When the color-index/full-color switching bit is set to 0, the display control unit 60 uses a color-index display mode, and when this is set to 1, a full color mode is used. Also, when the overlay-plane/display-area switching bit is set to 0, the display control unit 60 displays the overlay plane, while it displays the display area when this bit is set to 1.

As set forth above, the control data is set pixel by pixel in the control plane 75 so as to be able to control each pixel of the image displayed on the CRT 57. In effect, the display control unit 60 creates a combined image by selecting each one pixel from the corresponding pixels of the provided images according to the data set in the control plane 75.

As described above, an image data is first stored in the transfer area 55 to be transferred to the display area 56 by means of a high speed transfer method such as BIT-BLT, and an image stored in the display area 56 can only be displayed on the CRT 57. In other words, an image data stored in the transfer area 55 can be displayed only via the display area 56. Thus, when there are errors in the displayed image, it can not be decided whether the errors are created during the transfer from the 3D frame memory 51 to the transfer area 55 or during the transfer from the transfer area 55 to the display area 56. Also, when an image data in the display area 56 is evacuated to the transfer area 55 in the process of window operations, a check can not be made if the transfer of the image data is completed without any errors. These checks are necessary in effectively testing software and hardware of the graphic display device, for example, at the final stage of the developing process or when examining malfunctioning devices.

Accordingly, there is a need in the field of graphic display devices for a graphic display device which has the function of displaying image data in the transfer area so that a check on the result of transfer can be made easily.

SUMMARY OF THE INVENTION

Accordingly, it is a general object of the present invention to provide a graphic display device which satisfies the need described above.

It is another and more specific object of the present invention to provide a graphic display device which has the function of displaying image data in the transfer area so that a check on the result of the transfer can be made easily.

In order to achieve the above objects, a graphic display device according to the present invention for displaying image data provided from a memory includes a transfer memory unit for storing the image data transferred from the memory, a display memory unit for storing the image data transferred from the transfer memory unit, a display unit for displaying the image data supplied from an image source, the image source being the display memory unit in a first operation mode of the graphic display device, and a switching unit for selecting the image source from the display memory unit or the transfer memory unit, so that the display unit can display the image data stored in the transfer memory unit in a second operation mode of the graphic display device. Thus, the graphic display device can display image data of the transfer memory unit, so that a check on transfer operations can be easily made during a test of the device.

Other objects and further features of the present invention will be apparent from the following detailed description when read in conjunction with the accompanying drawings.

DESCRIPTION OF THE PREFERRED EMBODIMENTS

Figure 1:
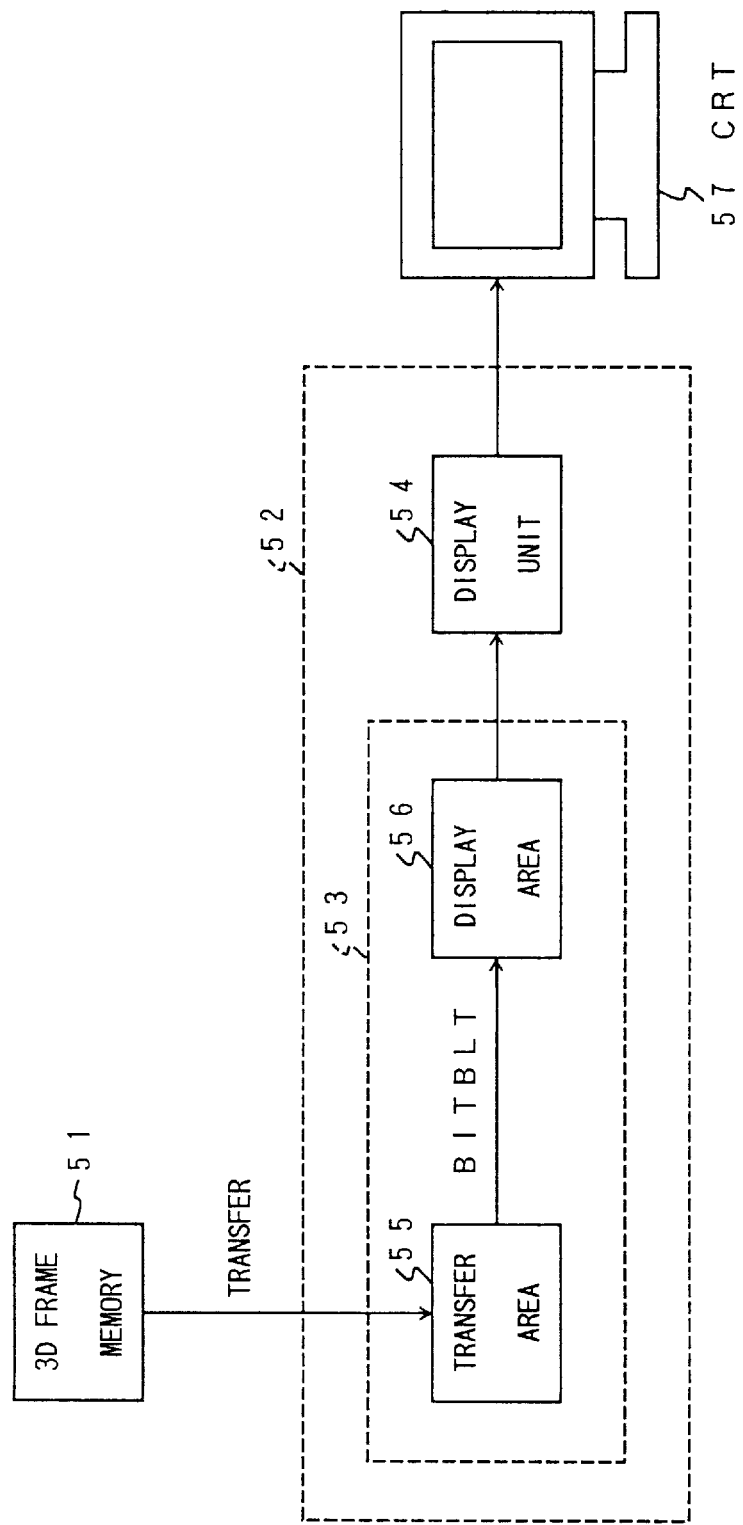
FIG. 1 is a block diagram of a graphic display device of the prior art.
Figure 2:
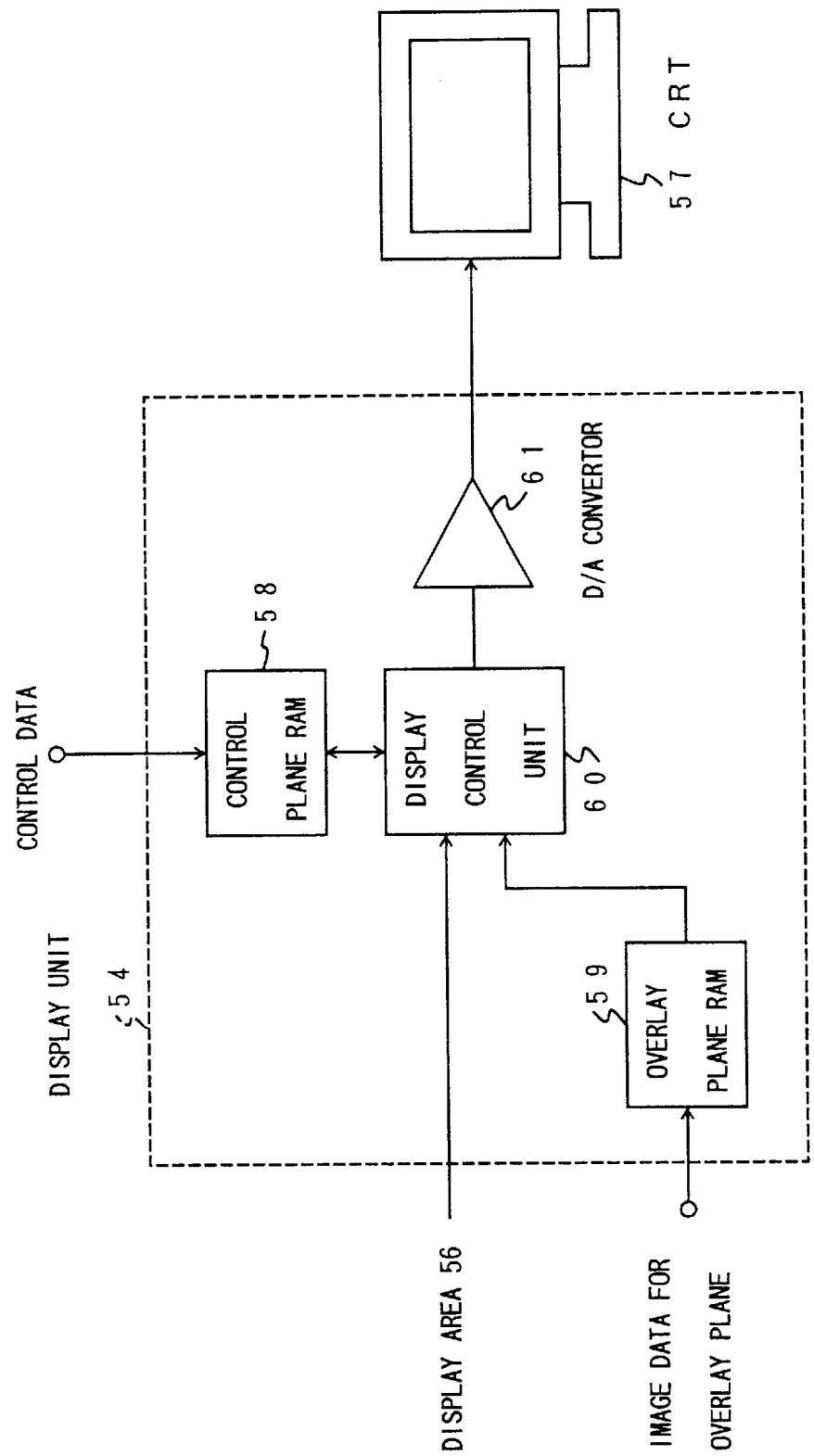
FIG. 2 is a block diagram of the display unit of FIG. 1.
Figure 3:
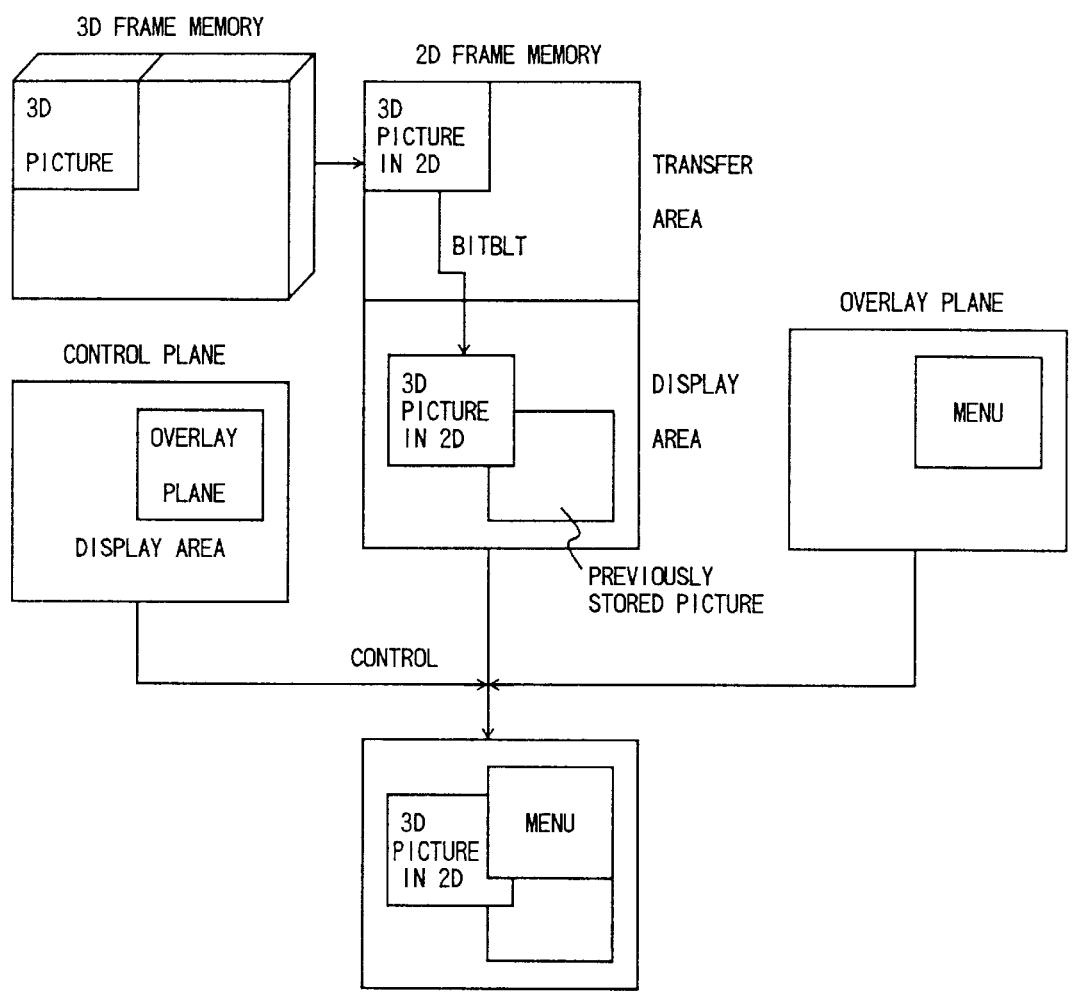
FIG. 3 is an illustrative drawing showing how each element of FIGS. 1 and 2 works to form a resulting image.
Figure 4:
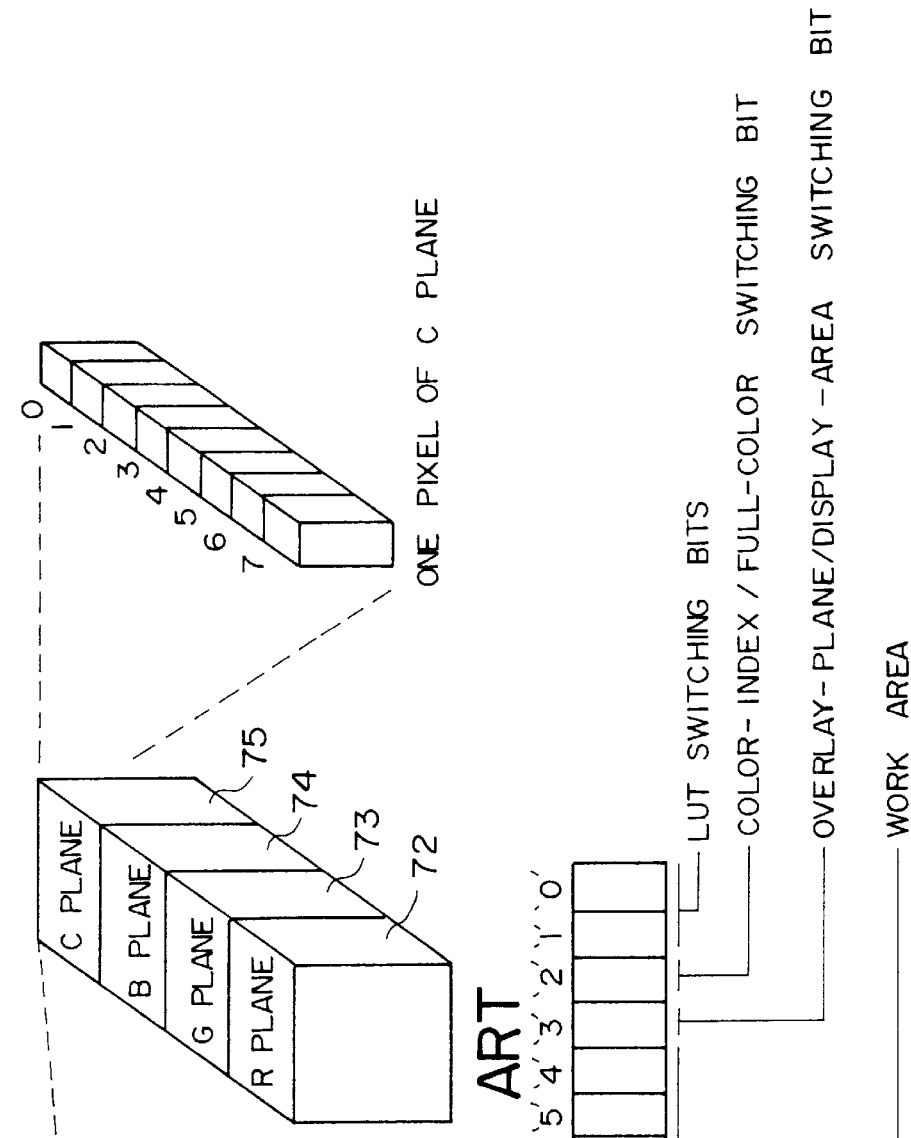
FIGS. 4A to 4D are illustrative drawings showing the structure of the image data used in the prior art.
Figure 5:
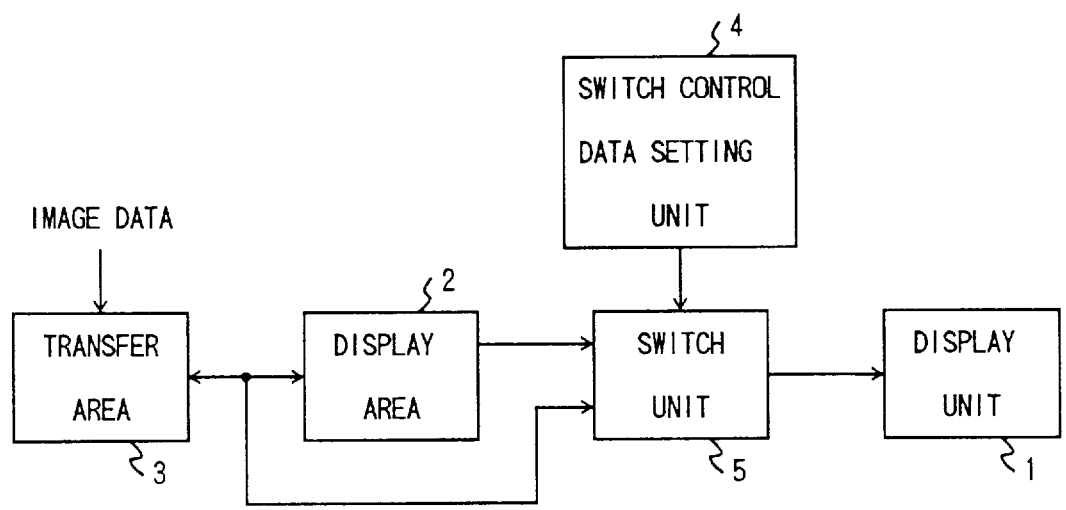
FIG. 5 is a block diagram of the principle of the present invention.

FIG. 5 shows a block diagram of the principle of the present invention. A display unit 1 displays an image of provided image data.

A display area 2 stores image data which is provided for the display unit 1 to display the image.

A transfer area 3 stores image data provided from external units to send it to the display area 2, and, also, receives an image data stored in the display area 2 when it needs to be evacuated therefrom.

A switch control data setting unit 4 sets switch control data.

A switch unit 5 receives two image data from the transfer area 3 and the display area 2, and provides the display unit 1 with either the image data stored in the transfer area 3 or the image data stored in the display area 2 so that the display unit 1 displays either one of two images.

Figure 6:
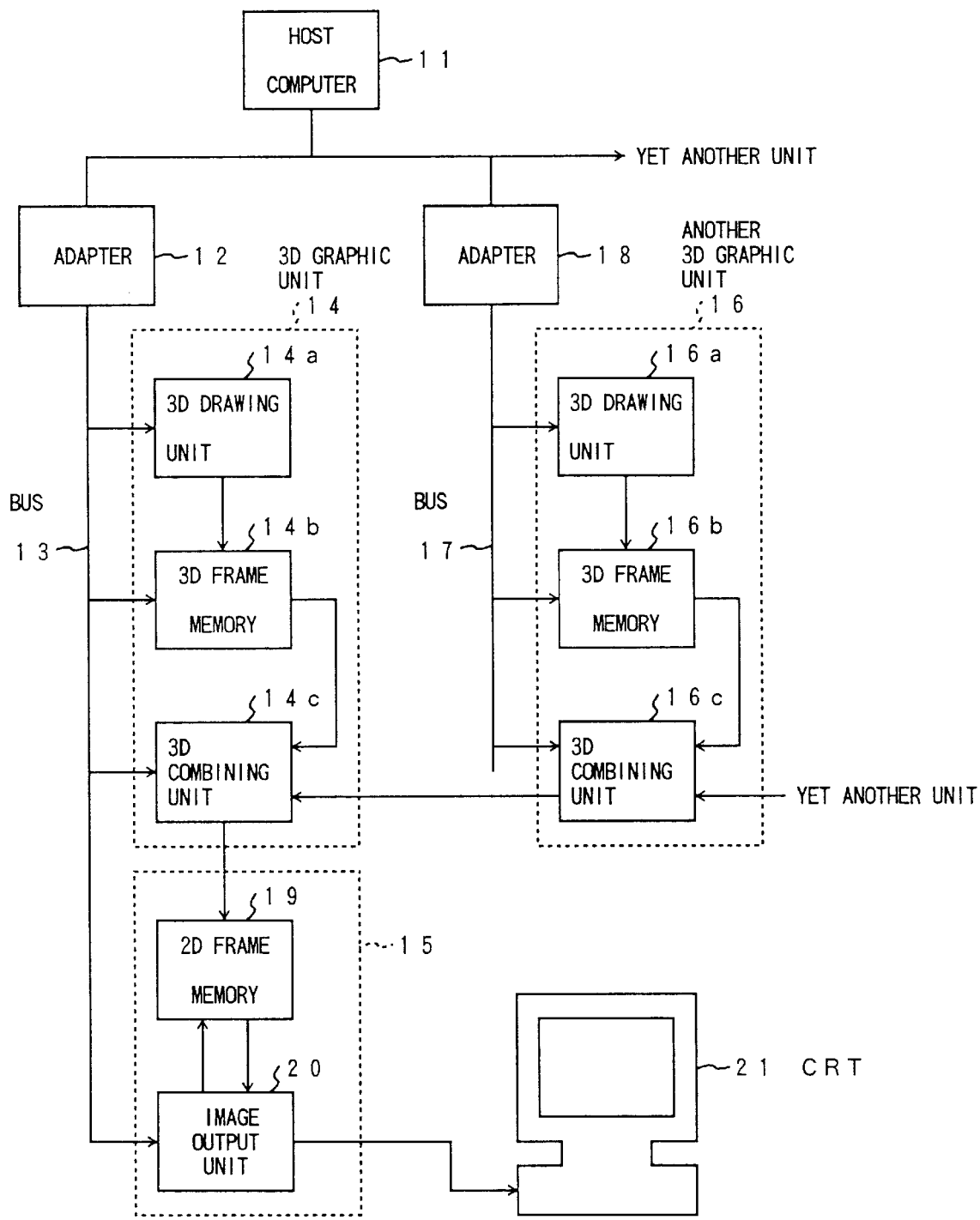
FIG. 6 is a block diagram of a graphic display device according to a preferred embodiment of the present invention.

FIG. 6 shows a block diagram of a preferred embodiment according to the present invention. A host computer 11 is connected to a bus 13 via an adapter 12 to provide the bus 13 with graphic data and various command signals.

The bus 13 is connected to a 3D graphic unit 14 for generating 3D images and a 2D graphic unit 15 for generating 2D images to be displayed. Thus, the host computer 11 can convey to them the graphic data and the various command signals.

The 3D graphic unit 14 comprises a 3D drawing unit 14a for drawing 3D images of the image data provided from the host computer 11, a 3D frame memory 14b for storing the 3D images in a three dimensional form drawn by the 3D drawing unit 14a, and a 3D combining unit 14c for combining 3D images stored in the 3D frame memory 14b with 3D images created by another 3D graphic unit 16.

The 3D drawing unit 14a is connected to the bus 13 to receive the 3D graphic data provided by the host computer 11 via the adapter 12, and draws 3D images in the 3D frame memory 14b by using the 3D graphic data. The 3D frame memory 14b which is structured of RAM and the like is connected to the bus 13 so as to be controlled by command signals via the bus 13 in memory writing and memory reading. The 3D frame memory stores image data in a three dimensional form drawn by the 3D drawing unit 14a.

The 3D combining unit 14c is connected to the bus 13, the 3D frame memory 14b, and another 3D graphic unit 16 so as to receive 3D image data stored in the 3D frame memory 14b, 3D image data created or combined by another 3D graphic unit 16, and command signals via the bus 13. The 3D combining unit 14c combines the 3D image data according to those command signals.

Another 3D graphic unit 16 has the same structure as that of the 3D graphic unit 14, and comprises a 3D drawing unit 16a for drawing 3D images of the image data provided from the host computer 11, a 3D frame memory 16b for storing the 3D images in a three dimensional form drawn by the 3D drawing unit 16a, and 3D combining unit 16c for combining 3D images stored in the 3D frame memory 16b with 3D images created or combined by yet another 3D graphic unit. The drawing unit 16a, the 3D frame memory 16b, and the 3D combining unit 16c are connected to a bus 17, which is corrected to the host computer 11 via the adapter 18. Yet another graphic unit which is connected to another graphic unit 16 also has the same structure as does another graphic unit 16, and is connected to the host computer 11 via a bus adapter, creates or combines 3D image data, and provides them for the 3D combining unit 16c of the 3D graphic unit 16.

The 3D combining unit 14c of the 3D graphic unit 14 obtains a 3D image data by combining all the image data created by a plurality of 3D graphic units. The combined 3D image data is then transformed into a two dimensional form and provided for a 2D graphic unit 15. The 2D graphic unit 15 comprises a 2D frame memory 19 for storing 2D image data to be displayed and an image output unit 20 for generating analog signals corresponding to the 2D image data stored in the 2D frame memory 19.

Figure 7:
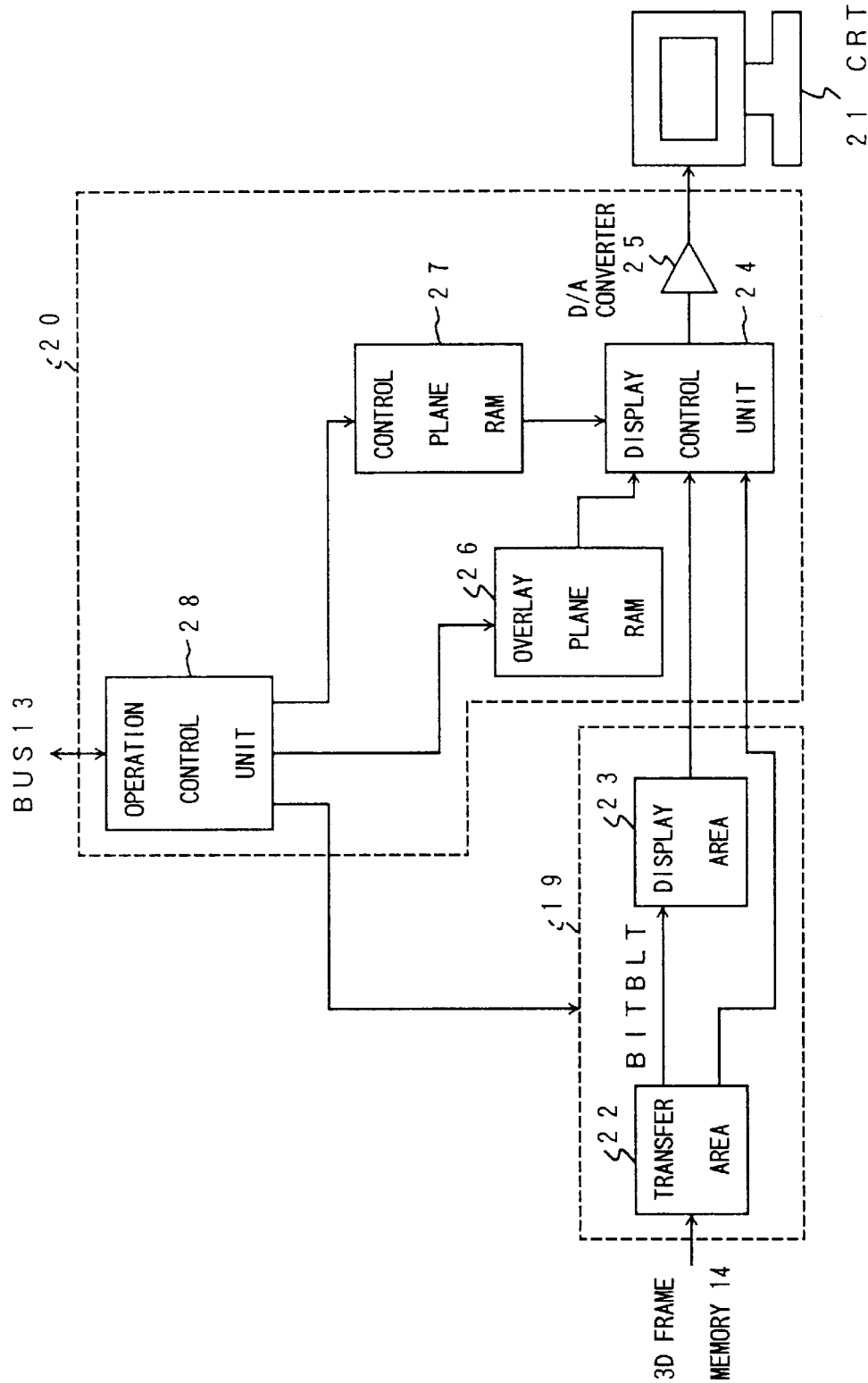
FIG. 7 is a block diagram of the 2D graphic unit of FIG. 6.

FIG. 7 shows a block diagram of the 2D graphic unit 15. The 2D frame memory 19 is comprised of a transfer area 22 and a display area 23. The transfer area 22 is connected to the 3D combining unit 14c to store 2D image data which is transformed from the 3D image data of the 3D combining unit 14c. The transfer area 22 receives the 2D image data according to the commands provided by the image output unit 20. When storing the image data of one frame is completed, the image data is transferred at a high speed from the transfer area 22 to the display area 23, and, also, is directly provided for the image output unit 20. The image data in the display area 23 transferred from the transfer area 22 through a high speed transfer method like BIT-BLT is also provided for the image output unit 20.

The image output unit 20 comprises a display control unit 24 for controlling a display screen, a D/A converter 25 for converting the display image data from the display control unit 24 into analog signals and for providing the analog signals for a CRT 21. The image output unit 20 further comprises an overlay plane RAM 26 for storing the image data of the overlay plane which is used for superimposing the menu of a window system and the like on the image stored either in the display area 23 or in the transfer area 22, and a control plane RAM 27 for storing the data of the control plane which is used for controlling the display image bit by bit. The image output unit 20 further includes an operation control unit 28 which is connected to the host computer 11 through the adapter 12 and the bus 13 to control the 2D frame memory 19 and a resulting image according to the commands given by the host computer 11. The display control unit 24 receives image data from the transfer area 22, the display area 23, and the overlay plane RAM 26, and, also, is provided with the control data by the control plane RAM 27. By using those pieces of data, the display control unit 24 forms image data to be displayed, which is provided for the D/A converter 25. The overlay plane RAM 26 is connected to the operation control unit 28 to receive and store the overlay image data.

The control plane RAM 27 is also connected to the operation control unit 28 to receive and store the control data.

The D/A converter 25 converts the image data generated by the display control unit 24 into analog signals to be supplied to the CRT 21. Then, the CRT 21 displays the image using the video analog signal provided by the D/A converter 25.

Figure 8:
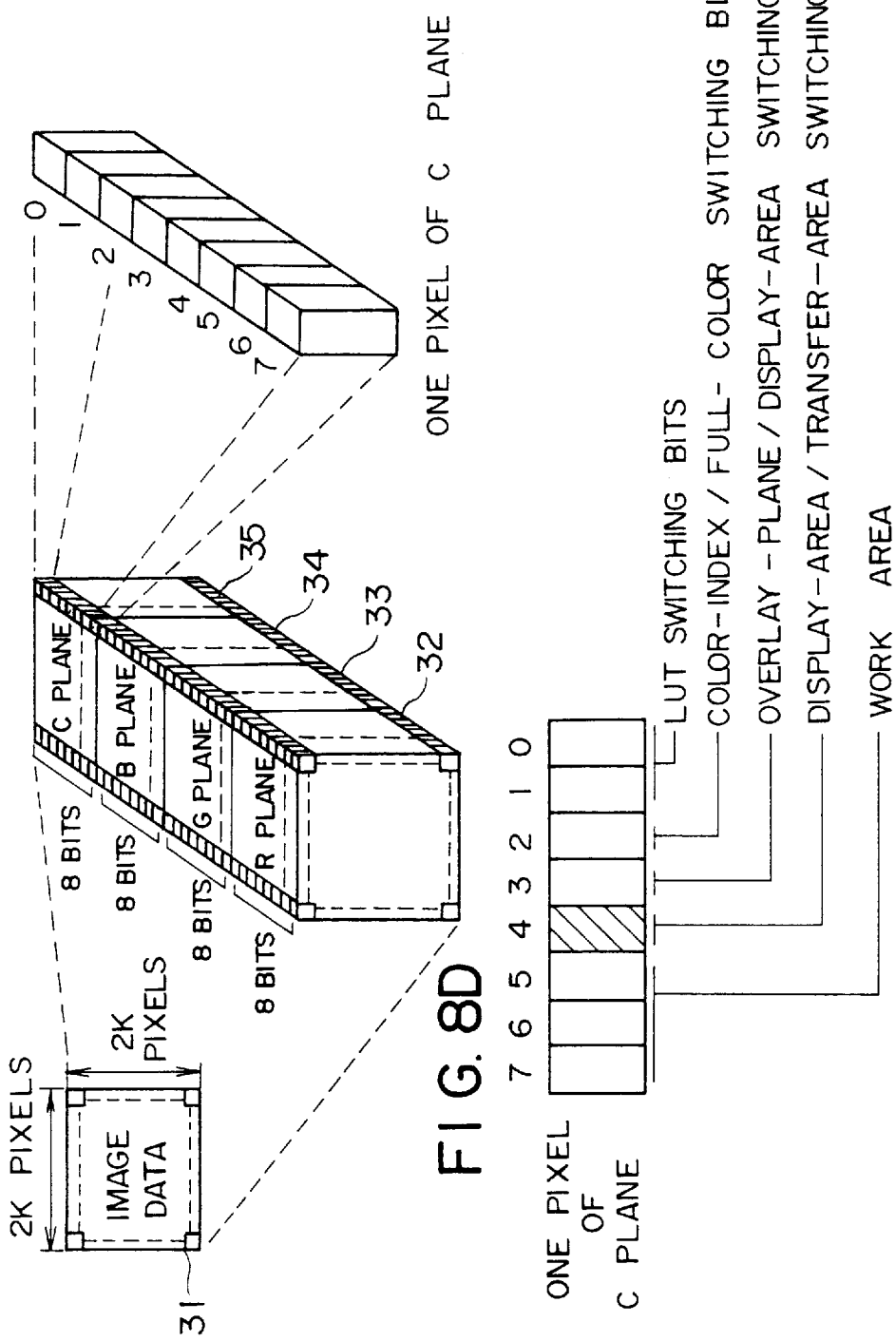
FIGS. 8A to 8D are illustrative drawings showing the structure of the image data used in the graphic display device according to the preferred embodiment of the present invention.

FIGS. 8A and 8B show the data structure of the display data used by the display control unit 24. As shown in the FIGS. 8A and 8B, the image data 31 used in the display control unit 24 is comprised of R, G, B, and control planes 32, 33, 34, and 35, and each plane is structured in an 2D array of 2k pixels by 2k pixels, each of which pixels is 8 bits. The R plane 32 represents pixel by pixel the luminance of the red light component by 8 bit data, the G plane 33 is for green light component, and the B plane 34 for blue light component.

As shown in FIGS. 8C and 8D, the control plane 35 has 8 bits, and the first and second bits are used as LUT (Look Up Table) switching bits, the third bit as a color-index/full-color switching bit, the fourth bit as a overlay-plane/display-area switching bit, the fifth bit as display-area/transfer-area switching bit, and the sixth through eighth bits as the work area, which is not used at present.

When the color-index/full-color switching bit is set to 0, the display control unit 24 uses a color-index display mode, and when this is set to 1, a full color mode is used. Also, when the overlay-plane/display-area switching bit is set to 0, the display control unit 24 displays the overlay plane, while it displays the display area when this bit is set to 1. When the display-area/transfer-area switching bit is set to 1, the image of the transfer area is displayed. When it is set to 0, the displayed image is not the image of the transfer area but that of the display area.

The control data is set pixel by pixel so as to be able to control each pixel of the image displayed on the display screen. By using this data, the display control unit 24 creates a combined image by selecting each one pixel from the corresponding pixels of the provided images.

Figure 9:
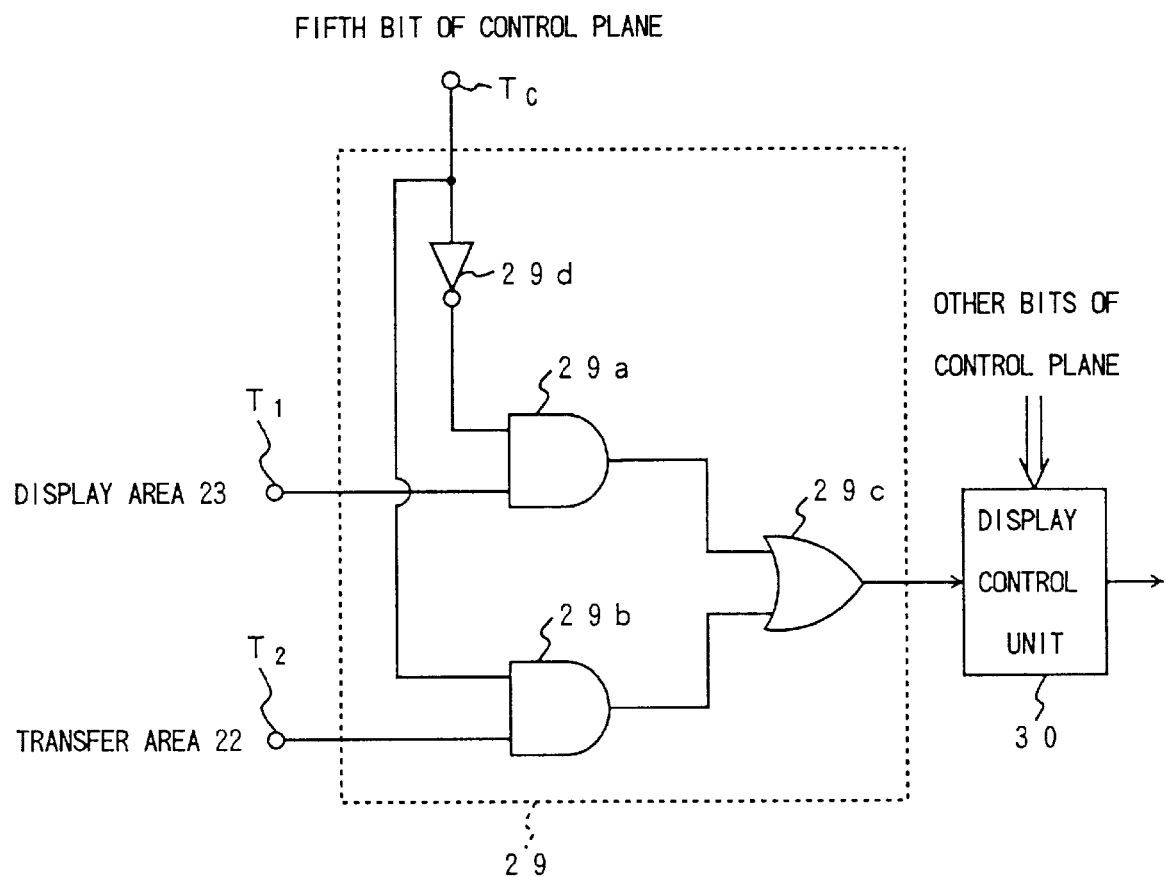
FIG. 9 is a block diagram of the display control unit 24 of FIG. 7.

FIG. 9 shows a block diagram of the display control unit 24. The display control unit 24 comprises a switching part 29 for switching back and forth between the display area 23 and the transfer area 22, and a display control unit 30 for display control of color-index/full-color display and overlay-plane/display(transfer)-area display.

The switching part 29 includes AND-gates 29a and 29b and an OR-gate 29c. One input port of the AND-gate 29a is connected to a control node Tc via an inverter 29d, and one input port of the AND-gate 29b is directly connected to the control node Tc. The control node Tc is supplied the data of the fifth bit of the control data provided by the control plane RAM 27, which bit is the display-area/transfer-area switching bit. The other input port of the AND-gate 29a is connected to an input node T1, which is connected to the display area 23 to receive image data. The other input port of the AND-gate 29b is connected to an input node T2, which is connected to the transfer area 22 to receive the image data stored therein.

The outputs of the AND-gates 29a and 29b are provided for the display control circuit 30 via the OR-gate 29c. In the switching part 29, when the control node Tc is 1 which means the image of the transfer area 22 is displayed, the AND-gates 29a and 29b are off and on, respectively, so that the image data of the transfer area 22 is provided for the display control circuit 30.

On the other hand, when the control node Tc is 0 which means the image of the transfer area is not displayed, the AND-gates 29a and 29b are on and off, respectively, so that the image data of the display area 23 is provided for the display control circuit 30.

Since the display-area/transfer-area switching bit supplied to the control node Tc is provided bit by bit in the control plane, the display image can be switched pixel by pixel. Thus, the images of the display area 23 and the transfer area 22 can be superimposed on one another.

As described above, not only the images of the display area 23 and the overlay plane but also the image of the transfer area 22 can be displayed on the CRT 21. Thus, the comparison of the image of the display area 23 with that of the transfer area 22 on the CRT 21 makes it possible to check if the transfer between the transfer area 22 and the display area 23 in either direction, especially in the case of the BIT-BLT high speed transfer, is carried out without errors.

Accordingly, the software and hardware of the graphic display device can be tested efficiently with a relatively simple architecture.

Figure 10:
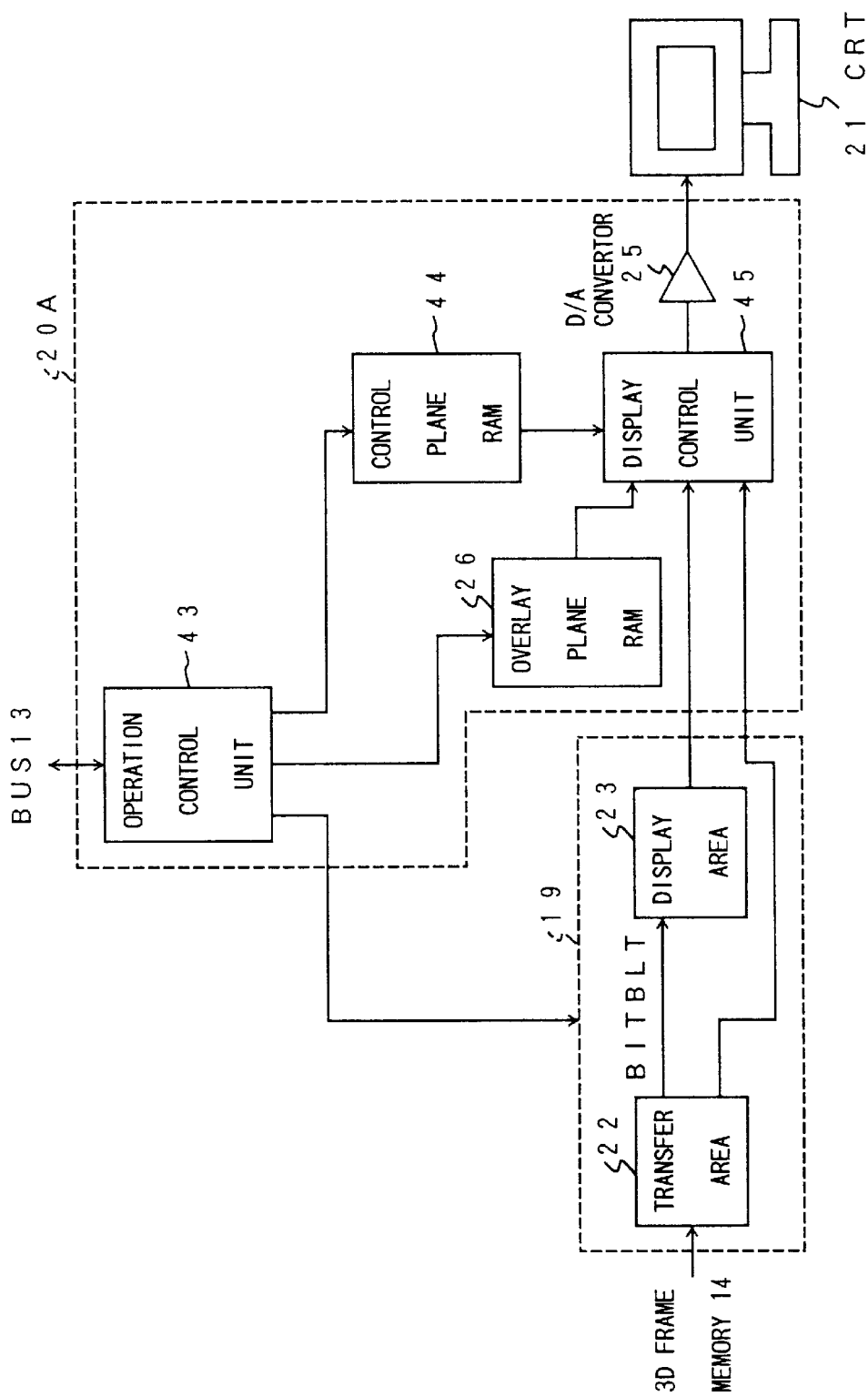
FIG. 10 is a block diagram of a 2D graphic unit according to a second preferred embodiment of the present invention.
Figure 11:
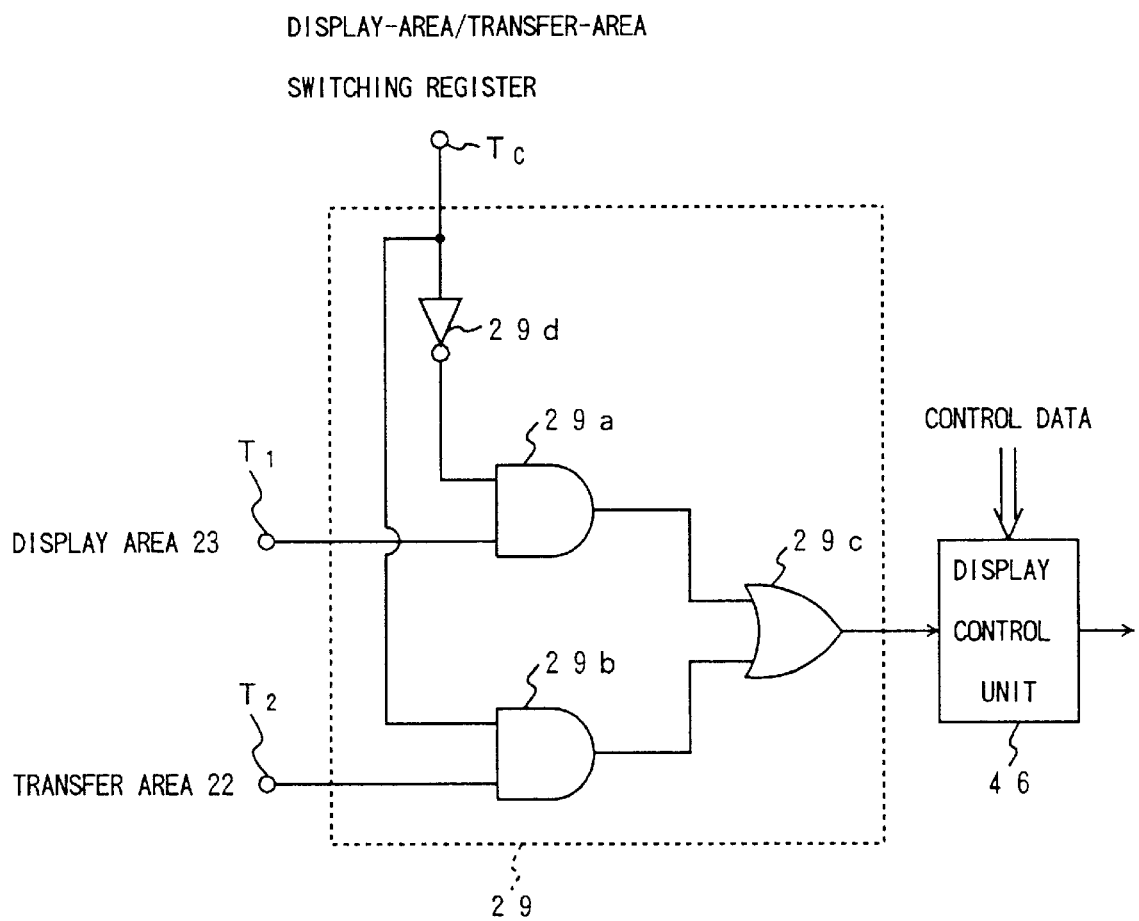
FIG. 11 is a block diagram of the display control unit 45 of FIG. 10.

FIGS. 10 and 11 show a block diagram of a second preferred embodiment of the present invention. In FIGS. 10 and 11, the same elements as those of FIGS. 7 and 9 are referred to by the same numerals, and will not be explained further.

In FIG. 10, an image output unit 20A differs from that of FIG. 7, and comprises an operation control unit 43, a control plane RAM 44, and a display control unit 45. The control plane RAM 44 of this preferred embodiment has the same data structure as that of the prior art, which does not have the display-area/transfer-area switching bit. Instead of this one bit, a display-area/transfer-area switching register is provided in the operation control unit 43, and has one bit data which can switch between images in the transfer area and in the display area.

The display control unit 45 in FIG. 11 comprises a switching part 29 for switching between the display area 23 and the transfer area 22, and a display control circuit 46 for display control of color-index/full-color display and overlay-plane/display(transfer)-area display.

In this preferred embodiment, a control node Tc is provided with data of either 1 or 0 from the display-area/transfer-area switching register in the operation control unit 43 via the control plane RAM 27. In the switching part 29, when the control node Tc is 1, i.e., an image in the transfer area 22 is selected to be displayed, AND gates 29a and 29b are off and on, respectively. Thus, data from the transfer area 22 is provided for the display control circuit 30.

When the control node Tc is 0, i.e., an image in the display area 23 should be displayed, AND gates 29a and 29b are on and off, respectively. Thus, data from the display area 23 is provided for the display control circuit 30.

Since display-area/transfer-area switching data stored in the operation control unit 43 and supplied to the control node Tc is one bit for the entire image, the CRT 21 displays either an image in the display area or an image in the transfer area. As different from the case of the first embodiment, switching between those two images is carried out on the whole image rather than on each pixel.

The display control circuit 46 is provided with control data from the control plane RAM 44, and can switch between color-index display and full-color display and between overlay-plane display and display(transfer)-area display. As in the prior art, this switching of the display modes is controlled by data stored in the control plane.

As described above, according to the present invention, the graphic display device can display an image not only stored in the display area but also stored in the transfer area, so that image data in both the display area and the transfer area can be examined. Thus, a check whether data transfer is carried out without errors can be easily made in this graphic display device.

Further, the present invention is not limited to these embodiments, but various variations and modifications may be made without departing from the scope of the present invention.

What is claimed is:

1. A graphic display device for displaying image data provided from a memory comprising:

transfer memory means for storing the image data transferred from said memory;

display memory means for storing the image data transferred from said transfer memory means;

display means for displaying the image data supplied from an image source, said image source being said display memory means in a first operation mode of said graphic display device so that said display means displays said image data without visible flickers and without interfering with data transfer from said memory to said transfer memory means; and switching means for selecting said image source from said display memory means or said transfer memory means, so that said display means can display said image data stored in said transfer memory means by bypassing said display memory means in a second operation mode of said graphic display device to allow a user to check whether said image data stored in said transfer memory means contains an error.

2. The graphic display device as claimed in claim 1, wherein said switching means selects said image source pixel by pixel by using the same number of bits of information as the number of pixels of said image data.

3. The graphic display device as claimed in claim 1, wherein said switching means selects said image source for the entire image data by using one bit of information.

4. The graphic display device as claimed in claim 1, wherein transfer between said display memory means and said transfer memory means is carried out by a high speed transfer method.

5. The graphic display device as claimed in claim 4, wherein said image data can be transferred from said display memory means to said transfer memory means.

6. The graphic display device as claimed in claim 5, wherein said memory is an image memory storing three dimensional image data.

* * * * *

UNITED STATES PATENT AND TRADEMARK OFFICE
CERTIFICATE OF CORRECTION

PATENT NO. : 5,774,134
DATED : June 30, 1998
INVENTOR(S) : Hideki SAITO

It is certified that error appears in the above-identified patent and that said Letters Patent is hereby corrected as shown below:

Title Page, in [63], delete "which is a continuation-in-part of Ser. No. 288,723, August 15, 1994, abandoned".

Title Page, insert the following priority information: "Japan 5-310840 December 10, 1993--.

Signed and Sealed this

Twenty-ninth Day of December, 1998

*Attest:*

BRUCE LEHMAN

*Attesting Officer*  *Commissioner of Patents and Trademarks*